(12) United States Patent
Yoshida

(10) Patent No.: US 7,814,742 B2
(45) Date of Patent: Oct. 19, 2010

(54) INTEGRATED COAL GASIFICATION COMBINED CYCLE PLANT

(75) Inventor: Naoshige Yoshida, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 970 days.

(21) Appl. No.: 11/637,833

(22) Filed: Dec. 13, 2006

(65) Prior Publication Data

US 2008/0141646 A1 Jun. 19, 2008

(51) Int. Cl.
F02C 3/26 (2006.01)
(52) U.S. Cl. .................. 60/39.464; 60/39.182; 60/781; 60/39.12
(58) Field of Classification Search ................ 60/39.12, 60/781, 39.182, 801, 772, 39.464, 39.5, 39.511
See application file for complete search history.

(56) References Cited

U.S. PATENT DOCUMENTS

| | | | | |
|---|---|---|---|---|
| 3,849,662 A | * | 11/1974 | Blaskowski et al. | 290/2 |
| 4,212,160 A | * | 7/1980 | Blaskowski | 60/39.12 |
| 5,265,410 A | * | 11/1993 | Hisatome | 60/39.12 |
| 5,313,913 A | * | 5/1994 | Ohshita et al. | 122/4 D |
| 5,440,873 A | * | 8/1995 | Toda et al. | 60/39.12 |
| 5,509,264 A | | 4/1996 | Ito et al. | |
| 5,517,815 A | * | 5/1996 | Fujioka et al. | 60/39.12 |
| 5,673,634 A | * | 10/1997 | Karger et al. | 110/234 |
| 5,704,206 A | * | 1/1998 | Kaneko et al. | 60/39.12 |
| 5,765,365 A | * | 6/1998 | Fujioka et al. | 60/39.12 |

(Continued)

FOREIGN PATENT DOCUMENTS

JP 57-131998 A 8/1982

(Continued)

OTHER PUBLICATIONS

Japanese Office Action dated Jun. 16, 2009, issued in corresponding Japanese Patent Application No. 2004-188886, no English Translation Provided to Determine its Relevancy.

(Continued)

*Primary Examiner*—William H Rodríguez
(74) *Attorney, Agent, or Firm*—Westerman, Hattori, Daniels & Adrian, LLP

(57) ABSTRACT

The problem of a heat exchanger of a heat recovery steam generator being corroded by sulfuric acid is solved, and the gas temperature at the outlet of the heat recovery steam generator is set at a value equal to or lower than the dew point of sulfuric acid, thereby realizing an integrated coal gasification combined cycle plant with high efficiency. A flue-gas-desulfurization-type integrated coal gasification combined cycle plant includes a gasifier configured to convert pulverized coal to a gas fuel; an heat recovery steam generator configured to generate steam; a gas turbine which is operated by the gas fuel and which supplies a combustion exhaust gas to the heat recovery steam generator; a steam turbine which is operated by the steam generated by the heat recovery steam generator; a power generator connected to at least one of the gas turbine and the steam turbine; and a desulfurization equipment configured to desulfurize the combustion exhaust gas discharged from the heat recovery steam generator, the desulfurized combustion exhaust gas being exhausted into the atmosphere, wherein the heat recovery steam generator includes an acid-resistant feedwater heater which preheats boiler feedwater and which is provided at the downstream side of a main heat exchanger.

2 Claims, 2 Drawing Sheets

U.S. PATENT DOCUMENTS

| | | | |
|---|---|---|---|
| 5,988,080 A * | 11/1999 | Miyoshi et al. | 110/343 |
| 6,032,456 A * | 3/2000 | Easom et al. | 60/793 |
| 6,598,399 B2 * | 7/2003 | Liebig | 60/772 |
| 6,872,373 B2 * | 3/2005 | Tatsuhara et al. | 423/244.03 |
| 7,029,639 B2 * | 4/2006 | Yasutake et al. | 423/244.09 |
| 2006/0178263 A1 * | 8/2006 | Tatsuhara et al. | 502/417 |
| 2007/0137169 A1 * | 6/2007 | Ishigami et al. | 60/39.12 |
| 2008/0134658 A1 * | 6/2008 | Yoshida | 60/39.12 |
| 2008/0141647 A1 * | 6/2008 | Yoshida | 60/39.12 |
| 2009/0151315 A1 * | 6/2009 | Kamohara et al. | 60/39.24 |

FOREIGN PATENT DOCUMENTS

| | | |
|---|---|---|
| JP | 58-55601 A | 4/1983 |
| JP | 58-58236 U | 4/1983 |
| JP | 58-97401 U | 7/1983 |
| JP | 7-4260 A | 1/1995 |
| JP | 11-148603 A | 6/1999 |
| JP | 2001-153588 A | 6/2001 |
| JP | 2002-364801 A | 12/2002 |
| JP | 2006-10225 A | 1/2006 |

OTHER PUBLICATIONS

Japanese Office Action dated Oct. 28, 2008, issued in corresponding Japanese Patent Application No. 2004-188886, no English Translation Provided to Determine its Relevancy.

\* cited by examiner

INTEGRATED COAL GASIFICATION COMBINED CYCLE PLANT

BACKGROUND OF THE INVENTION

1. Field of the Invention

The present invention relates to an integrated coal gasification combined cycle plant for combined power generation using coal as fuel, and in particular, to an increase in the plant efficiency in a flue-gas-desulfurization-type integrated coal gasification combined cycle plant.

This application is based on Japanese Patent Application No. 2004-188886, the content of which is incorporated herein by reference.

2. Description of Related Art

Heretofore, a flue-gas-desulfurization-type integrated coal gasification combined cycle (hereinafter referred to as "IGCC") plant has been known. In such a flue-gas-desulfurization-type IGCC plant, an exhaust gas in a gas turbine contains a large amount of a sulfur component. However, since a heat recovery steam generator (HRSG) provided at the downstream side of the gas turbine includes a carbon steel heat exchanger therein, sulfuric acid produced from the sulfur component causes a corrosion problem.

In order to prevent this corrosion, the gas temperature at the outlet of the heat recovery steam generator must be set at a value (for example, about 150° C.) higher than the dew point (130° C.) of sulfuric acid. However, when the gas temperature at the outlet of the heat recovery steam generator is set at a high value, thermal energy of a gas recovered from the exhaust gas of the gas turbine at the heat recovery steam generator is decreased. Consequently, the output of a steam turbine which utilizes steam generated by heat recovery steam generator is decreased, thereby decreasing the plant efficiency.

According to a proposed example measure for the above-described corrosion caused by sulfuric acid, by adjusting the amount of recirculation in a deaerator, the gas temperature at the outlet of the, heat recovery steam generator is controlled to a value equal to or higher than the dew point of sulfuric acid. In this method, the corrosion can be prevented by increasing the temperature of a metal at the heat transfer surface which is in contact with the gas, but the gas temperature also increases at the same time. Consequently, the amount of heat recovery is decreased, resulting in a problem of reduced power generation efficiency (see, for example, Japanese Unexamined Patent Application, Publication No. Hei-11-148603).

In the above flue-gas-desulfurization-type IGCC plant, the plant efficiency is desirably increased by recovering the maximum amount of thermal energy from the exhaust gas (combustion exhaust gas) of the gas turbine. Therefore, preferably, by increasing the thermal energy recovered from the combustion exhaust gas of the gas turbine, even when the gas temperature at the outlet of the heat recovery steam generator is lower than the dew point of sulfuric acid, the corrosion problem of the heat recovery steam generator can be solved, thus realizing an IGCC plant with high efficiency.

BRIEF SUMMARY OF THE INVENTION

The present invention has been conceived in view of the above situation, and an object of the present invention is to provide an integrated coal gasification combined cycle plant in which, when the gas temperature at the, outlet of a heat recovery steam generator is set to a value equal to or lower than the dew point of sulfuric acid, the corrosion problem of a heat exchanger can be solved and high efficiency can be realized.

To solve the above problem, the present invention provides the following solutions.

An integrated coal gasification combined cycle plant of the present invention includes a gasifier configured to convert pulverized coal to a gas fuel; a heat recovery steam generator configured to generate steam; a gas turbine which is operated by the gas fuel and which supplies a combustion exhaust gas to the heat recovery steam generator; a steam turbine which is operated by the steam generated by the heat recovery steam generator; a power generator connected to at end of the gas turbine and the steam turbine; a desulfurization equipment configured to desulfurize the combustion exhaust gas discharged from the heat recovery steam generator, the desulfurized exhaust gas being exhausted into the atmosphere; and an acid-resistant feedwater heater configured to preheat boiler feedwater, the acid-resistant feedwater heater being provided at a downstream side of the heat recovery steam generator.

According to the integrated coal gasification combined cycle plant of the present invention, the acid-resistant feedwater heater for preheating boiler feedwater is provided at the downstream side of the heat recovery steam generator. Accordingly, steam can be generated by maximally utilizing thermal energy possessed by the combustion exhaust gas without being concerned with the corrosion problem caused by sulfuric acid.

In this case, the acid-resistant feedwater heater is preferably disposed at an area where the temperature of the combustion exhaust gas is lower than the dew point of sulfuric acid. Consequently, thermal energy possessed by the combustion exhaust gas can be effectively utilized while minimizing the use of the expensive acid-resistant feedwater heater.

In the above integrated coal gasification combined cycle plant, preferably, a cleaning water spray device is provided at an upstream side of the acid-resistant feedwater heater, and the flow direction of the combustion exhaust gas is the downward direction. Consequently, even during the operation of the power generation plant, the acid-resistant feedwater heater and the like can be cleaned by spraying a cleaning fluid in the downward direction, which is the same as the flow direction of the combustion exhaust gas.

That is, when the gas flow direction of the part to be cleaned is the downward direction, the acid-resistant feedwater heater and the like can be cleaned during operation. Since the water, after being used in the cleaning, flows into the downstream flue-gas-desulfurization equipment, a special waste water treatment system need not be added.

According to the above integrated coal gasification combined cycle plant of the present invention, the heat recovery steam generator includes the acid-resistant feedwater heater for preheating the boiler feedwater at the downstream side thereof. Therefore, steam can be generated by maximally utilizing thermal energy possessed by the combustion exhaust gas without being concerned with the corrosion problem of a heat exchanger caused by sulfuric acid produced from a sulfur component contained in the combustion exhaust gas. Consequently, significant advantages can be achieved, namely, realizing an integrated coal gasification combined cycle plant with high efficiency and improving the durability of the plant. In particular, when the acid-resistant feedwater heater is disposed at an area where the temperature of the combustion exhaust gas is lower than the dew point of sulfuric acid, and preheating of the boiler feedwater is performed, an integrated coal gasification combined cycle plant with high efficiency can be realized at low cost.

Furthermore, when the cleaning water spray device is provided at the upstream side of the acid-resistant feedwater heater, the cleaning fluid can be sprayed in the same direction as the flow direction of the combustion exhaust gas. Consequently, the acid-resistant feedwater heater and some equipments disposed at the downstream side thereof etc. can be cleaned without stopping the operation of the power generation plant.

DETAILED DESCRIPTION OF THE INVENTION

An embodiment of an integrated coal gasification combined cycle plant according to the present invention will now be described with reference to the drawings.

Figure 1:
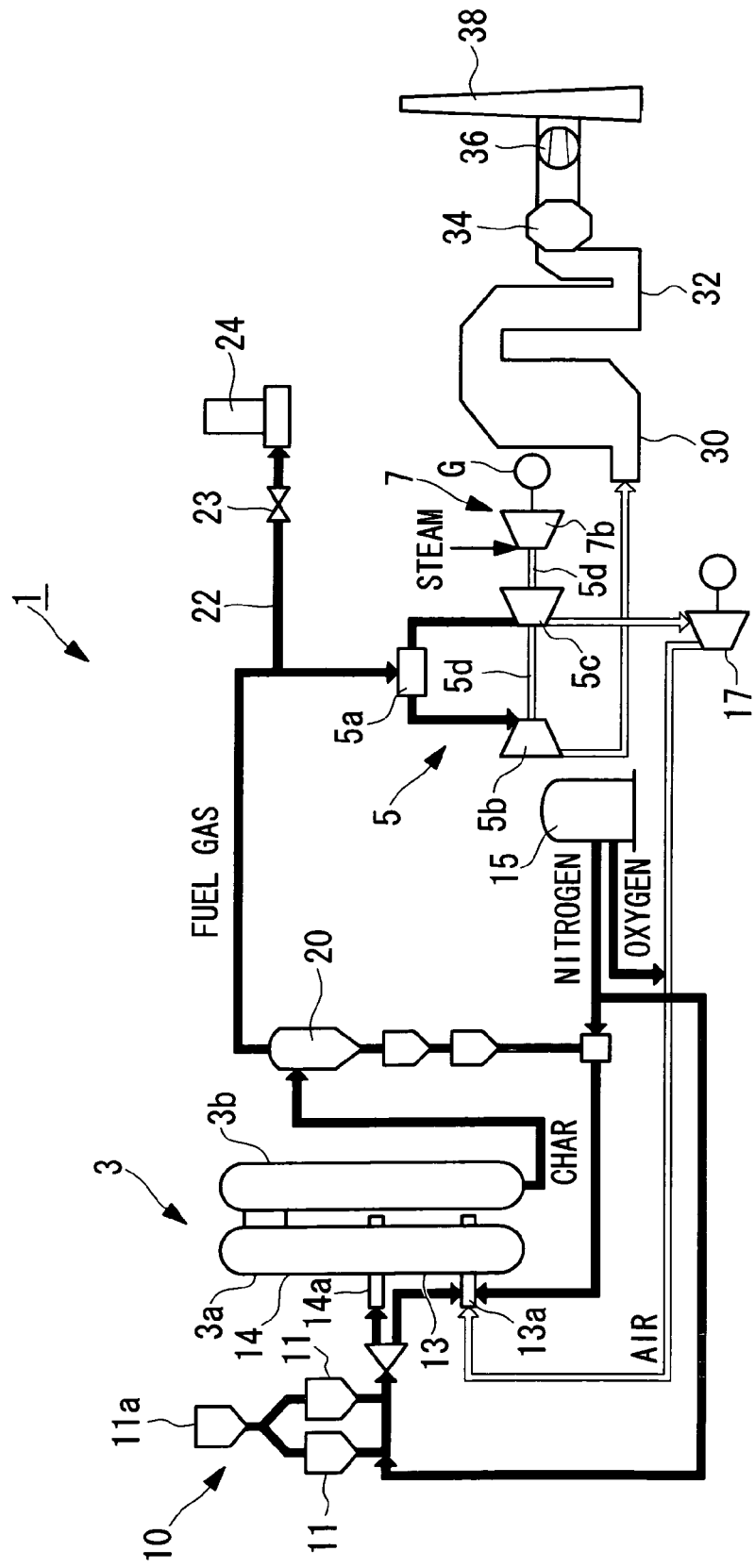
FIG. 1 is a schematic diagram showing the outline of an integrated coal gasification combined cycle plant.

As shown in FIG. 1, an integrated coal gasification combined cycle (hereinafter referred to as "IGCC") plant 1, using coal as fuel, primarily includes a gasifier 3, a gas turbine 5, and a steam turbine 7.

A coal supply system 10 for supplying pulverized coal to the gasifier 3 is provided at an upstream side thereof. This coal supply system 10 has a pulverizer (not shown) which pulverizes raw coal into pulverized coal having a particle size of several to several hundreds of micrometers and is designed so that the pulverized coal is stored in the pulverized coal bin 11a.

The pulverized coal stored in the bin 11a is fed at a constant flow rate to the gasifier 3 together with nitrogen gas supplied from an air separation unit 15.

The gasifier 3 has a coal gasification section 3a which is designed so that a gas flows from the lower side to the upper side and a heat exchange section 3b which is connected to the downstream side of the coal gasification section 3a and which is designed so that a gas flows from the upper side to the lower side.

In the coal gasification section 3a, a combustor 13 and a reductor 14 are provided in that order from the lower side. The combustor 13 is a portion in which the pulverized coal and char are partially burned, and the rest is pyrolyzed into volatile components (CO, $H_2$, and lower hydrocarbons). In the combustor 13, an entrained bed is used. Alternatively, a fluidized bed or a fixed bed may also be used.

The combustor 13 and the reductor 14 are provided with a combustor burner 13a and a reductor burner 14a, respectively, and the pulverized coal is supplied thereto from the coal supply system 10.

The combustor burner 13a is designed so that air from an air booster 17 is supplied thereto together with oxygen separated in the air separation unit 15. As described above, the configuration is designed so that air containing oxygen at a controlled concentration is supplied to the combustor burner 13a.

In the reductor 14, the pulverized coal is gasified by a high-temperature combustion gas supplied from the combustor 13. Consequently, flammable gases such as CO and $H_2$ are produced from the coal. The coal gasification reaction is an endothermic reaction in which carbon atoms in the pulverized coal and char are allowed to react with $CO_2$ and $H_2O$ in a high-temperature gas to produce CO and $H_2$.

In the heat exchange section 3b of the gasifier 3, a plurality of heat exchangers is provided and is designed to generate steam using the sensible heat obtained from the gas fed from the reductor 14. The steam generated in the heat exchangers is primarily used to drive a steam turbine 7b.

The gas passing through the heat exchange section 3b is fed to a char recovery equipment 20. This char recovery equipment 20 has porous filters, and when the gas is made to pass therethrough, char contained in the gas is trapped and recovered. This char is returned to the combustor burner 13a of the gasifier 3, together with the nitrogen gas separated by the air separation unit 15, for recycling.

The gas passing through the char recovery equipment 20 is then supplied as a fuel gas to a combustor 5a of the gas turbine 5.

A branching path 22 is provided between the char recovery equipment 20 and the combustor 5a of the gas turbine 5, and a flare system 24 is provided downstream of this branching path 22, with a valve 23 interposed therebetween. The flare system 24 is a system for processing a gas having a small calorific value by combustion, which is produced during a startup stage of the gasifier 3.

The gas turbine 5 has the combustor 5a in which the gas obtained by gasification is burned, a gas turbine 5b driven by the combustion gas, and a turbo compressor 5c feeding high-pressure air to the combustor 5a. The gas turbine 5b and the turbo compressor 5c are connected to each other by a rotating shaft 5d. The air compressed by the turbo compressor 5c is supplied to the air booster 17 in addition to the combustor 5a.

A combustion exhaust gas (gas-turbine exhaust gas) passing through the gas turbine 5b is supplied to an heat recovery steam generator (HRSG) 30.

The steam turbine 7b of the steam turbine system 7 is connected to the same rotating shaft 5d as that of the gas turbine 5, so that a so-called single-shaft combined system is formed. High-pressured steam is supplied to the steam turbine 7b from the gasifier 3 and the heat recovery steam generator 30. In addition to the single-shaft combined system, a multi-shaft combined system may also be used.

A power generator G which outputs electricity from the rotating shaft 5d driven by the gas turbine 5b and the steam turbine 7b is provided at one side of the steam turbine 7 opposite to that of the gas turbine 5. However, the position of the power generator G is not limited to that described above, and the power generator G may be disposed at any position so long as an electrical output can be obtained from the rotating shaft 5d.

The heat recovery steam generator 30 generates steam by the combustion exhaust gas from the gas turbine 5b, and a flue gas desulfurization (FGD) equipment 32 is provided downstream of the combustion exhaust gas flow of the heat recovery steam generator 30. This flue gas desulfurization equipment 32 is designed to remove a sulfur component in the exhaust gas.

The gas passing through the desulfurization equipment 32 is allowed to pass through a wet-type electric precipitator (wet-EP) 34 and an induction fan (i.e., boost-up fan (BUF)) 36 and is then exhausted into the atmosphere via a stack 38.

Next, the structures of the heat recovery steam generator 30 and the periphery thereof will now be described in detail with reference to FIG. 2.

The heat recovery steam generator 30 receives the combustion exhaust gas which has done its work in the gas turbine 5b and heats boiler feedwater to produce steam. In a boiler-water piping system 40 through which the boiler feedwater is circulated, a feedwater pump 41, an acid-resistant feedwater heater 42, a main heat exchanger 43, the steam turbine 7b, and a steam condenser 44 form a closed circuit connected by piping 45.

The feedwater pump 41 is a delivery device of the boiler feedwater which circulates in the boiler-water piping system 40 and whose state is repeatedly changed in the order: feedwater, steam, and condensed water.

The acid-resistant feedwater heater 42 performs heat exchange between the combustion exhaust gas and the boiler feedwater in the heat recovery steam generator 30. The acid-resistant feedwater heater 42 functions as a preheater that preliminarily heats the boiler feedwater by effectively utilizing the exhaust heat of the combustion exhaust gas through this heat exchange.

In the acid-resistant feedwater heater 42 used in this embodiment, an acid-resistant film is provided on all surfaces that are in contact with the combustion exhaust gas. Examples of the acid-resistant film which is effective against sulfuric acid produced from a sulfur component contained in the combustion exhaust gas include a film of a fluorocarbon resin (polytetrafluoroethylene) such as Teflon (registered trademark), a chromium (Cr) film formed by thermal spraying, and a composite film including an undercoat composed of Cr or a Ni—Cr alloy and a topcoat composed of the ceramic $Cr_2O_3$.

In the heat recovery steam generator 30, the main heat exchanger 43 is disposed at the upstream side of the acid-resistant feedwater heater 42 in the flow direction of the combustion exhaust gas. The main heat exchanger 43 heats the boiler feedwater by heat exchange with the high-temperature combustion exhaust gas to generate steam.

The steam condenser 44 is a heat exchanger that cools the steam which has done its work in the steam turbine 7b to convert it back to water.

A heat absorber 51 of a gas-gas heat exchanger 50 is disposed at the downstream side of the acid-resistant feedwater heater 42 in the flow direction of the combustion exhaust gas. In the gas-gas heat exchanger 50, the heat absorber 51, a radiator 52, and a heat-medium circulation unit 53 form a closed circuit connected by piping 54. A heat medium which absorbs heat at the heat absorber 51 transfers the thermal energy to the radiator 52 by the operation of the heat-medium circulation unit 53. The radiator 52 is disposed at the downstream side of the wet-type electric precipitator 34 and functions as a gas reheater which heats the combustion exhaust gas, before exhausting it into the atmosphere via the stack 38, to a temperature at which white smoke is not produced.

In addition, at the upstream side of the acid-resistant feedwater heater 42, spray nozzles 61 are provided in a cleaning water line 60 as a cleaning water spray device which sprays cleaning water in the same direction as the combustion exhaust gas flowing downward. Cleaning water is supplied to the cleaning water line 60 as required. The acid-resistant feedwater heater 42 and the equipments disposed at the downstream side thereof etc. can be cleaned by spraying the cleaning water from the spray nozzle 61.

Figure 2:
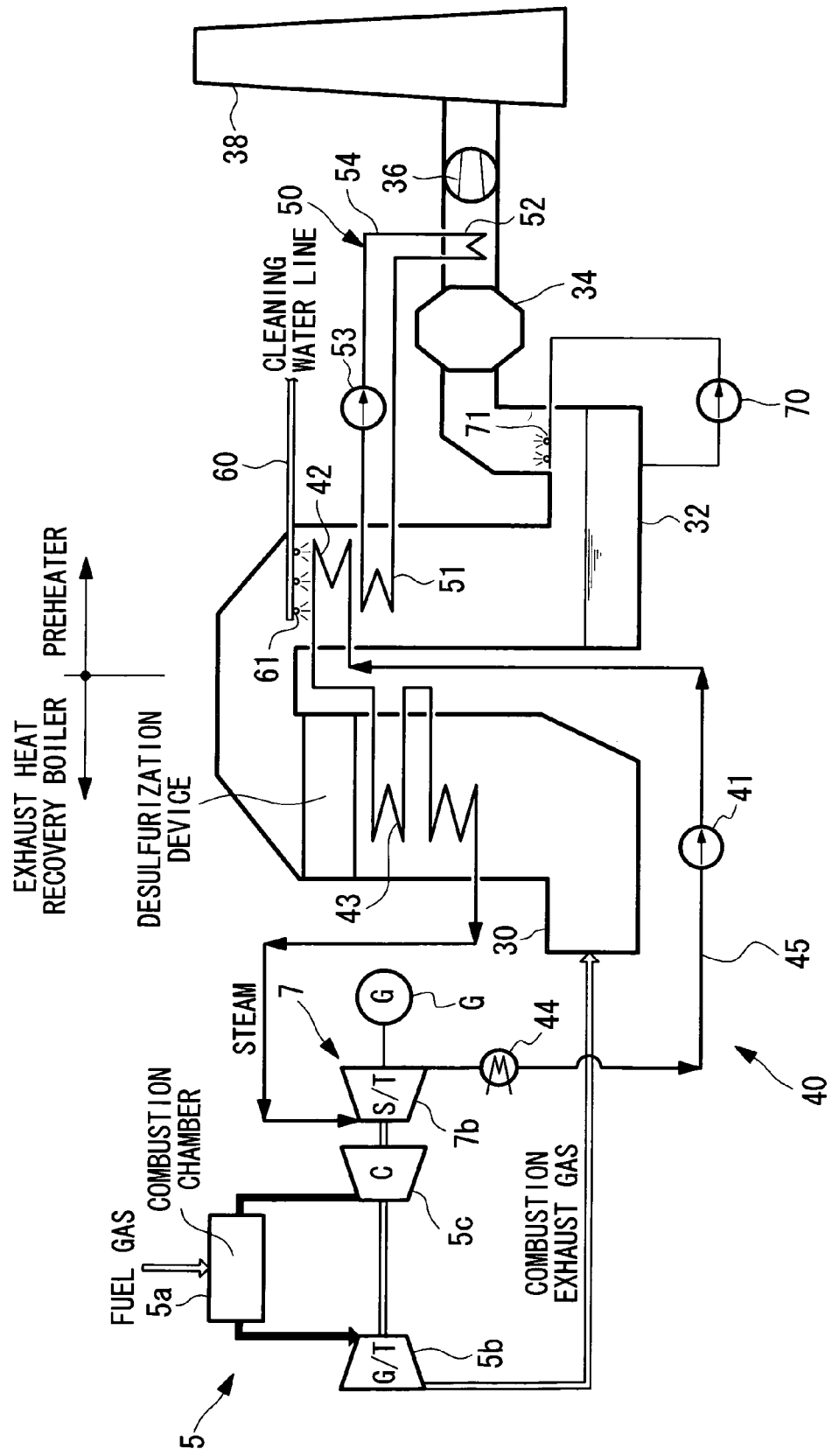
FIG. 2 is a schematic diagram showing the relevant part of the integrated coal gasification combined cycle plant according to the present invention.

Additionally, in FIG. 2, reference numeral 70 indicates an sulfur-absorbing-liquid circulating pump, and reference numeral 71 indicates a nozzle.

Next, the operation of the IGCC plant 1 having the above structure will be described.

Raw coal is pulverized with a pulverizer (not shown) and is then fed to the pulverized coal bin 11a for storage. The pulverized coal stored in the bin 11a is fed into pulverized coal supply hoppers 11, and supplied to the reductor burner 14a and the combustor burner 13a together with nitrogen gas separated by the air separation unit 15. Furthermore, in addition to the pulverized coal, the char recovered by the char recovery equipment 20 is also supplied to the combustor burner 13a.

As combustion air for the combustor burner 13a, air which is prepared by adding oxygen separated by the air separation unit 15 to compressed air obtained by further increasing the pressure of compressed air extracted from the turbo compressor 5c using the air booster 17 is used. In the combustor 13, the pulverized coal and the char are partially burned with the combustion air, and the rest is pyrolyzed to generate volatile components (CO, $H_2$, and lower hydrocarbons).

In the reductor 14, the pulverized coal supplied via the reductor burner 14a and the char from which the volatile components are discharged in the combustor 13 are gasified by a high-temperature gas rising from the combustor 13 to produce flammable gases such as CO and $H_2$.

The gases passing through the reductor 14 transfer their sensible heat to the heat exchangers while passing through the heat exchange section 3b of the gasifier 3, so that steam is generated. The steam generated in the heat exchange section 3b is primarily used to drive the steam turbine 7b.

The gasses passing through the heat exchange section 3b are fed to the char recovery equipment 20, so that char is recovered. The char is returned to the gasifier 3.

The gases passing through the char recovery equipment 20 are fed to the combustor 5a of the gas turbine 5 and are then burned together with the compressed air supplied from the turbo compressor 5c. The gas turbine 5b is rotated by this combustion gas, and the rotating shaft 5d is driven.

During the startup stage of the gasifier 3, it is not possible to obtain a gas which has a calorific value suitable for use as fuel supplied to the combustor 5a of the gas turbine 5. Therefore, a gas having a low calorific value is fed to the flare system 24 by opening the valve 23 so as to be processed by combustion.

The combustion exhaust gas passing through the gas turbine 5b is fed to the heat recovery steam generator 30, and by using the sensible heat of this combustion exhaust gas, steam is generated. The steam generated in the heat recovery steam generator 30 is primarily used to drive the steam turbine 7b. During this exhaust heat recovery of the combustion exhaust gas, at the upstream side of the combustion exhaust gas introduced into the heat recovery steam generator 30, the boiler feedwater flowing through the main heat exchanger 43 is heated by the high-temperature combustion exhaust gas and is converted to steam. The combustion exhaust gas whose temperature has been decreased by this heat exchange passes through the acid-resistant feedwater heater 42 disposed at the downstream side and preheats the low-temperature boiler feedwater by heating.

That is, in order to efficiently utilize the thermal energy possessed by the combustion exhaust gas, the high-temperature combustion exhaust gas and the preheated boiler feedwater are subjected to heat exchange in the main heat exchanger 43 to efficiently generate steam, and in addition, the combustion exhaust gas whose temperature has been decreased preheats the low-temperature boiler feedwater in the acid-resistant feedwater heater 42. This two-stage heating enables effective use of the thermal energy.

Furthermore, even when the temperature of the combustion exhaust gas is decreased in preheating the boiler feedwater by the acid-resistant feedwater heater 42, and the ambient temperature is decreased to the dew point of sulfuric acid or lower, that is, 130° C. or lower, corrosion by sulfuric acid does not occur because a heat exchanger in which an acid-resistant film is provided on all surfaces in contact with the combustion exhaust gas is used. That is, even when the exhaust heat possessed by the combustion exhaust gas is maximally recovered by the acid-resistant feedwater heater 42 without consideration of the dew point of sulfuric acid, and the boiler feedwater is maximally preheated, the corrosion problem does not occur. Consequently, the efficiency of the IGCC plant 1 can be increased.

The steam turbine 7b is rotated by the steam from the gasifier 3 and the steam from the heat recovery steam generator 30 to drive the rotating shaft 5d of the gas turbine 5. The torque of the rotating shaft 5d is then converted to an electrical output by the power generator G.

The combustion exhaust gas passing through the heat recovery steam generator 30 is fed to the desulfurization equipment 32, and the sulfur component is removed thereby. Subsequently, the combustion exhaust gas sucked by the induction fan 36 passes, through the, wet-type electric precipitator 34 so as to remove ash dust and sulfuric acid mist in the combustion exhaust gas. Furthermore, the combustion exhaust gas then passes through the radiator 52 to be heated to a temperature at which white smoke is not produced, and is then exhausted into the atmosphere via the stack 38.

When cleaning of the acid-resistant feedwater heater 42 is required during the above operation, cleaning can be performed by spraying cleaning water from the spray nozzle 61 without stopping the operation of the IGCC plant 1. This is because the flow direction of the combustion exhaust gas in the heat recovery steam generator 30 is the same as the flow direction of the cleaning water. Accordingly, the operation of the system need not be interrupted by stopping for cleaning.

The present invention is not limited to the above embodiment, and modifications may be optionally made without departing from the scope and the spirit of the present invention.

What is claimed is:

1. A flue-gas-desulfurization-type integrated coal gasification combined cycle plant comprising:
    a gasifier configured to convert pulverized coal to a gas fuel;
    a heat recovery steam generator configured to generate steam;
    a gas turbine which is operated by the gas fuel and which supplies a combustion exhaust gas to the heat recovery steam generator;
    a steam turbine which is operated by the steam generated by the heat recovery steam generator;
    a power generator connected to at least one of the gas turbine system and the steam turbine;
    a desulfurization equipment configured to desulfurize the combustion exhaust gas discharged from the heat recovery steam generator, the desulfurized combustion exhaust gas being exhausted into the atmosphere; and
    an acid-resistant feedwater heater configured to preheat boiler feedwater, the acid-resistant feedwater heater being provided at a downstream side of the heat recovery steam generator, wherein
    the acid-resistant feedwater heater is disposed at an area where the temperature of the combustion exhaust gas is lower than the dew point of sulfuric acid.

2. The integrated coal gasification combined cycle plant according to claim 1, further comprising a cleaning water spray device provided at an upstream side of the acid-resistant feedwater heater, wherein the flow direction of the combustion exhaust gas is the downward direction.

* * * * *